United States Patent [19]

Nakano

[11] Patent Number: 5,083,473

[45] Date of Patent: Jan. 28, 1992

[54] RATIO CONTROL SYSTEM FOR TOROIDAL CONTINUOUSLY VARIABLE TRANSMISSION

[75] Inventor: Masaki Nakano, Kawasaki, Japan

[73] Assignee: Nissan Motor Co., Ltd., Yokohama, Japan

[21] Appl. No.: 572,083

[22] Filed: Aug. 24, 1990

[30] Foreign Application Priority Data

Aug. 30, 1989 [JP] Japan .................................. 1-223668

[51] Int. Cl.$^5$ ...................... F16H 15/00; G05G 1/00
[52] U.S. Cl. .................................... 74/190.5; 74/200; 74/559
[58] Field of Search ................... 74/190.5, 200, 559

[56] References Cited

U.S. PATENT DOCUMENTS 4,253,434 3/1981 Takizawa et al. ............... 74/559 X
4,960,004 10/1990 Hibi et al. ...................... 74/190.5 X

FOREIGN PATENT DOCUMENTS 63-225754 9/1988 Japan .

Primary Examiner—Allan D. Herrmann
Assistant Examiner—David W. Laub
Attorney, Agent, or Firm—Foley & Lardner

[57] ABSTRACT

A toroidal continuously variable transmission comprises a friction roller disposed between co-axial input and output discs and in driving contact therewith, and a roller carrier rotatably supporting the friction roller. A hydraulic actuator is operative to shift the roller carrier along a carrier axis. The hydraulic actuator is operable on hydraulic pressure supplied thereto by a ratio control valve. The ratio control valve includes a valve sleeve (i.e., a first member) moveable along a valve axis, and a spool (i.e., a second member) received in the valve sleeve and moveable along the valve axis, and a ratio control valve for regulating supply of hydraulic fluid to and discharge thereof from the hydraulic actuator in response to relative movement of the spool to the sleeve. A control arrangement includes a stepper motor for changing the sleeve from an initial position to a desired position. A cam is connected to the roller carrier for unitary motion about the carrier axis. A cam follower operatively disposed between the cam and one end of the spool. An adjustor is provided between the cam follower and the one end of the spool for adjusting relation between the rotary motion of the cam and the corresponding linear motion of the spool.

3 Claims, 2 Drawing Sheets

A known toroidal
continuously variable transmission of the above kind is
disclosed in JP-A 63-225754.

RATIO CONTROL SYSTEM FOR TOROIDAL CONTINUOUSLY VARIABLE TRANSMISSION

BACKGROUND OF THE INVENTION

The present invention relates to a toroidal continuously variable transmission, and more particularly to a ratio control system for a toroidal continuously variable transmission.

Recently, the use of toroidal continuously variable transmissions as motor vehicle transmissions has been highlighted again owing to development of traction oil with a high traction factor.

The toroidal continuously variable transmissions include coaxial input and output discs having facing toric surfaces, and a plurality of friction rollers, which may be called as power rollers, disposed between and in driving contact with the toric surfaces for transmitting a rotary motion between the input and output discs. For a ratio change, the friction rollers incline from an initial position to a new desired position. A known toroidal continuously variable transmission of the above kind is disclosed in JP-A 63-225754.

According to this known transmission, a plurality of friction rollers are rotatably supported by roller carriers, respectively, by eccentric shafts, respectively. Each of the roller carriers is supported on a housing by swivel joints for rotation about a carrier axis thereof and for limited movement along the carrier axis. Shifting the roller carriers along their carrier axes causes roller inclination of the associated friction rollers.

The axial displacement of each of the roller carriers is brought about by a hydraulic actuator supplied with hydraulic fluid from a ratio control valve. The roller inclination is determined by the amount of and direction of axial displacement of the associated roller carrier which in turn is controlled by the hydraulic fluid pressure via the associated hydraulic actuator.

The ratio control valve for the hydraulic actuators includes a sleeve moveable along a valve axis, and a spool slidably received by the sleeve for relative movement to the sleeve. A stepper motor is drivingly connected to the sleeve to change the sleeve from an initial position to a new desired position. A precess cam is provided on one of the roller carriers for converting a rotary motion of the roller carrier to a linear transational motion of the spool of the ratio control valve. The roller inclination is transmitted to the ratio control valve in this manner. The ratio control valve regulates supply of hydraulic fluid to and discharge thereof from the hydraulic actuators in response to movement of the sleeve relative to the spool.

From the preceding description, it will now be understood that the translation of the spool follows the translation of the sleeve, producing a desired roller inclination and thus a desired ratio position corresponding to a command supplied to the stepper motor by a control unit.

The above-mentioned known transmission suffers from a problem that an error in its feedback system is difficult to correct.

An object of the present invention is to improve a toroidal continuously variable transmission such that a deviation in its feedback system owing to manufacturing and/or assembling tolerances is easy to correct.

SUMMARY OF THE INVENTION

According to a toroidal continuously variable transmission, there are provided:
a housing;
co-axial input and output discs having facing toric surfaces;
a friction roller disposed between and in driving contact with said toric surfaces for transmitting torque between said input and output discs;
a roller carrier rotatably supporting said friction roller;
means grounded to said housing for rotatably supporting said roller carrier about a carrier axis;
hydraulic actuator means for biasing said roller carrier along said carrier axis;
ratio control valve means for controlling said hydraulic actuator means, said ratio control valve means including a first member moveable along a valve axis, a second member cooperating with said first member and moveable along said valve axis, and means for regulating supply of hydraulic fluid to and discharge thereof from said hydraulic actuator means in response to movement of said first member relative to said second member;
means for changing said first member from an initial position to a desired position;
means for converting a rotary motion of said roller carrier about said carrier axis into a linear motion of said second member along said valve axis; and
means for adjusting relationship between said rotary motion of said roller carrier about said carrier axis and said linear motion of said second member along said valve axis.

DETAILED DESCRIPTION OF THE INVENTION

Figure 1:
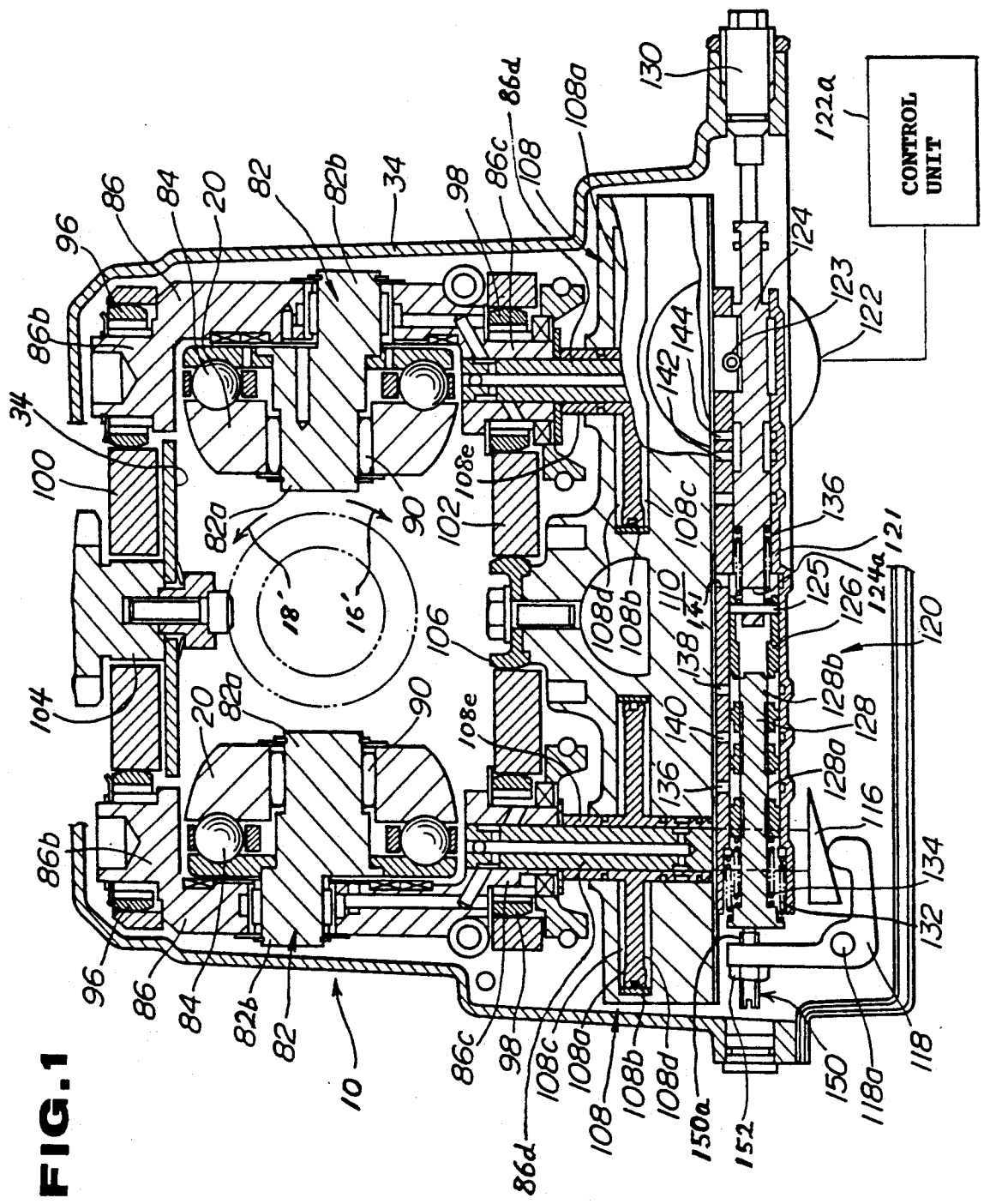
FIG. 1 is a slightly reduced cross section taking generally along the line I—I in FIG. 2 illustrating a toroidal continuously variable transmission according to the present invention.
Figure 2:
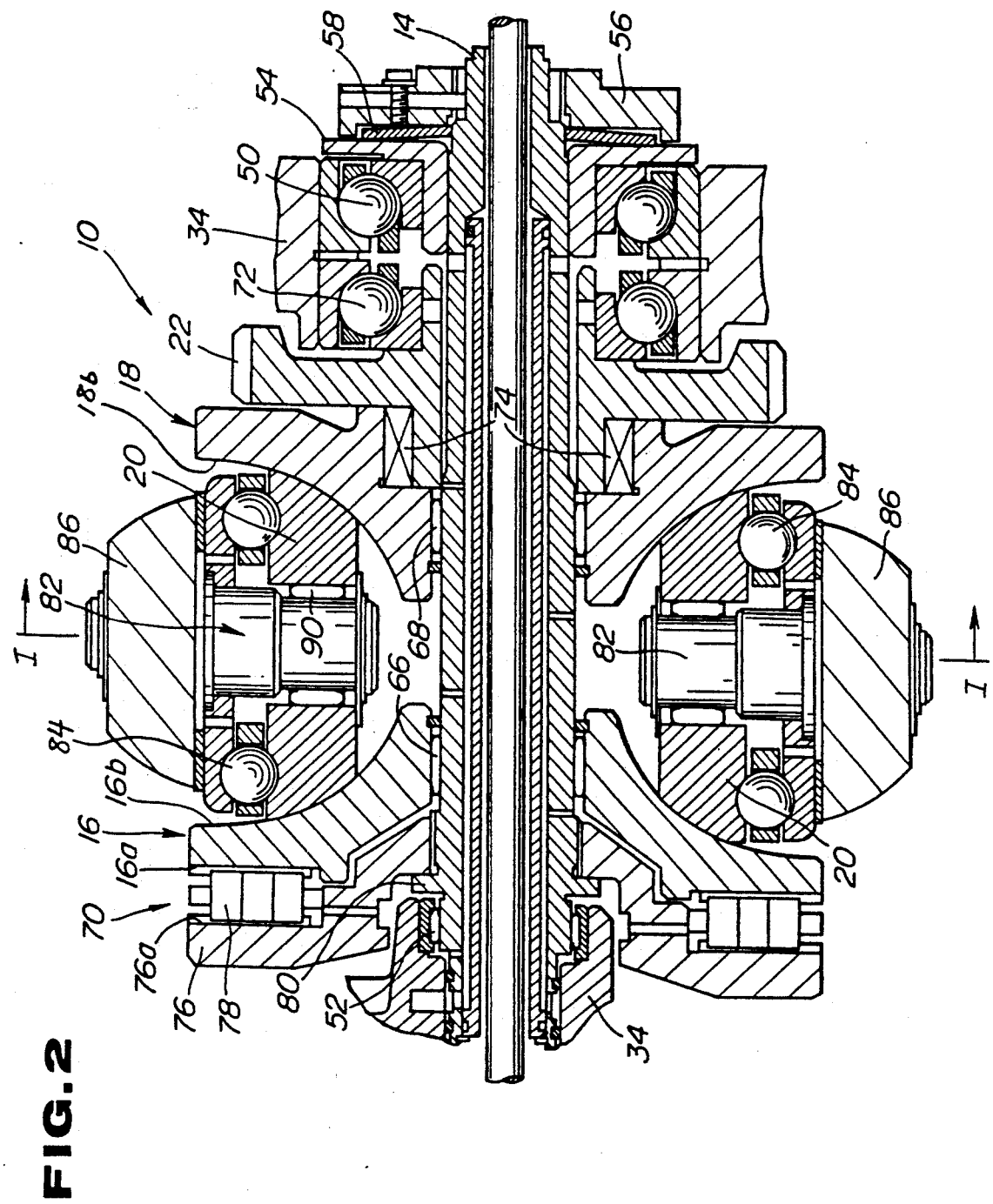
FIG. 2 is an axial section of the toroidal continuously variable transmission.

Referring to the accompanying drawings, particularly to FIG. 1, a toroidal continuously variable transmission according to the present invention is illustrated and generally denoted by the reference numeral 10. The transmission 10 includes a housing 34 and a block 110 secured to the housing 34 in an appropriate manner. As shown in FIG. 2, The transmission includes a power input shaft 14 which is drivingly connected to a motor vehicle engine by a torque converter, both being not shown, and a power output gear 22. Co-axial input and output discs 16 and 18 are rotatably supported on the power input shaft 14 by needle bearings 66 and 68. The input and output discs 16 and 18 have facing toric or toroidal surfaces 16b and 18b. Two circumferentially-spaced friction or power rollers are disposed between and in driving contact with the toric surfaces 16b and 18b.

The power input shaft 14 has a first portion rotatably supported on the housing 34 by ball bearing 50 and a second portion, spaced axially from the first portion, rotatably supported on the housing 34 by needle bearing 52. For loading the input shaft 14 axially, a disc spring 58 is operatively disposed between a spacer 54, by which the power input shaft 14 is supported on the ball bearing 50, and a loading nut 56 engaged with the power input shaft 14.

For transmitting rotary motion from the input shaft 14 to the input disc 16, a loading cam 70 is operatively disposed between the power input shaft 14 and the input disc 16. For understanding the loading cam 70, reference should be made to co-pending U.S. patent application Ser. No. 07/476,580 filed on Feb. 7, 1990 or its corresponding European Patent Application No. 90103336.5 filed on Feb. 21, 1990, which document has been hereby incorporated by reference in its entirety. Briefly, the loading cam 70 includes a cam flange 76 splined to the power input shaft 14, and a cam roller 78 disposed between and in driving contact with two facing cam surfaces 76a and 16a formed respectively on the cam flange 76 and the input disc 16.

With this loading cam 70, rotary motion is transmitted from the power input shaft 14 to the input disc 16. Within the loading cam 70, the cam flange 76 rotates relative to the input disc 16, inducing forces spreading them apart. Since the cam flange 76 is engaged by a circumferential shoulder 80 formed on the input shaft 14, the input disc 16 is biased toward the output disc 18.

The output disc 18 is drivingly connected to the power output gear 22 for unitary rotation therewith by a key 74. The output gear 22 is rotatably supported on the housing 34 by ball bearing 72.

The friction rollers 20 disposed between the toric surfaces 16b and 18b are rotatably supported on roller carriers 86 by roller bearings 84 and exccentric roller supporting shafts 82.

Referring to FIG. 1, each of the roller supporting shafts 82 has a first shaft portion 82a projecting into a central bore of the associated friction roller 20. Disposed between this shaft portion 82a and the central bore defining wall are needle bearings 90. The roller supporting shaft 82 includes an eccentric shaft portion 82b projecting into an offset bore formed through the associated one of the roller carriers 86.

In order to support the roller carriers 86, links 100 and 102 are provided. The link 100 is grounded to the housing 34 by a link post 104 fixed to the housing 34, while the other link 102 is supported on the block 110 fixed to the housing 34 by a link post 106 fixed to the block 110. Thus, this link 102 is also grounded to the housing 34. Each of the links 100 and 102 has two arms extending in the opposite directions towards the associated roller carriers 86, respectively. As best seen in FIG. 1, the roller carriers 86 have first or upper spindles 86b received in bores formed through the associated arms of the link 100, and second or lower spindles 86c received in bores formed through the associated arms of the link 102. A spherical ring 96 is coupled with each of the spindles 86b by needle bearings for limited relative axial displacement and in contact with the bore defining wall of the associated one of the two arms of the link 100 to form a swivel connection. Similarly, a spherical ring 98 is coupled with each of the spindles 86c by needle bearings for limited relative axial displacement and in contact with the bore defining wall of the associated one of the two arms of the link 102 to form a swivel connection. Owing to this supporting arrangement, each of the roller carriers 86 is moveable axially along and also rotatable about its carrier axis.

One of the second spindles 86c of the roller carriers 86 is bored to fixedly receive the associated motion transmitting rod 86d which extends through a cylinder 108b of the associated hydraulic actuator 108 and has a free end fixedly secured to a precess cam 116, while the other of the second spindles 86c is bored to fixedly receive the associated motion transmitting rod 86d which projects into a cylinder 108b of the associated hydraulic actuator 108. Each of the motion transmitting rods 86d extends through a hollowed piston stem 108e of a piston 108a of the associated hydraulic actuator 108 in an axial fit manner and for free rotary motion relative thereto. Each of the pistons 108a is disposed in the associated one of the cylinders 108b to define a first chamber 108c and a second chamber 108d.

From the previous description, it will now be appreciated that the hydraulic actuators 108 are operative to bias the roller carriers 86 along the carrier axes thereof, respectively.

The precess cam 116, in unitary motion with the motion transmitting rod 86d, partly forms a feedback system to be described later. One example of the precess cam is described in U.S. patent application Ser. No. 07/352,309 filed on May 16, 1989 by Toshifumi HIBI et al.

The hydraulic actuators 108 are controlled by a ratio control valve 120. The ratio control valve 120 includes an outer sleeve 121 fixed to the block 110. The outer sleeve 121 defines a stepped valve bore. Slidably disposed within the outer sleeve 121 are a rack rod 124, an inner sleeve 126 connected by a cross pin 125 to the rack rod 124 at one end portion thereof, i.e., a lefthand end thereof viewing in FIG. 1, and a spool 128 slidably disposed in the inner sleeve 126. The rack rod 124 and thus the inner sleeve 126 are axially moveable along a valve axis. In order to change the inner sleeve 126 from one position to another position, a stepper motor 122 is provided, which is operative on an output of a control unit 122a. The stepper motor 122 has a pinion 123 meshing the rack rod 124, so that rotation of the stepper motor 122 through a desired angle causes the inner sleeve 126 to move axially along the valve axis from one initial position to another desired position.

The rack rod 124 has an opposite end thereof, i.e., a right end thereof viewing in FIG. 1, operatively associated with a low switch 130. The low switch 130 is designed to detect a motion of the inner sleeve 126 in a direction toward a Lo (low) position.

The feedback system includes, in addition to the precess cam 116, a cam follower in the form of an L-shaped lever 118 swingable about a shaft 118a. With this feedback system, a rotary motion of the roller carrier 86 about its carrier axis, i.e., a roller inclination, is converted into a linear motion of the spool 128. Specifically, the L-shaped lever 118 has one arm terminating in a working end in slidable engagement with a working face of the precess cam 116. In order to act on the spool 128 on a lefthand end theeof, viewing in FIG. 1, the L-shaped lever 118 has an opposite arm extending toward the spool 128 and carrying a screw threaded rod 150a of an adjustor 150.

A first spring 132 is compressed between the spool 128 and the outer sleeve 121 so as to bias the spool 128 in a direction tending to maintain operative contact of the spool 128 with the screw rod 150a carried by the L-shaped lever 118. A second spring 134 which is weaker than the first spring 132 is compressed between the spool 128 and the inner sleeve 126. The second spring 134 is operative to maintain a proper operative contact between the pinion 123 and rack rod 124.

The cross pin 125 having its opposite ends fixedly connected to the inner sleeve 126 extends through a slot or window 124a which the rack rod 124 is formed with. A third spring 136 which is stronger than the second spring 134 but weaker than the first spring 132 is compressed between the cross pin 125 and the rack rod 124. Since the cross pin 125 is slidable within the slot 124a, a relative axial movement of the rack rod 124 with the inner sleeve 126 is permitted. Thus, movement of the rack rod 124 beyond the Lo position to a LoLo position is permitted, and the third spring 136 is compressed to allow this movement.

As shown in FIG. 1, the outer sleeve 121 is formed with an inlet port 140 connected to a source of line pressure, a first outlet port 136 connected to the servo chambers 108c of the hydraulic actuators 108, a second outlet port 138 connected to the servo chambers 108d of the hydraulic actuators 108. The outer sleeve 121 is formed also with a drain port 141, and two transfer ports 142 and 144. These transfer ports 142 and 144 are normally allowed to communicate with each other and form a part of a lock-up control circuit for a lock-up clutch of a torque converter such that when the fluid communication between these transfer ports 142 and 144 is blocked, the lock-up clutch is released. The setting is such that when the rack rod 124 assumes a maximum reduction ratio position, the fluid communication between the transfer ports 142 and 144 is blocked.

The spool 128 is formed with two axially spaced lands 128a and 128b. In a stable state, the spool 128 assumes a position relative to the inner sleeve 126 as shown in FIG. 1 wherein the lands 128a and 128b block the first and second outlet ports 136 and 138 by preventing the outlet port 136 from communicating with neither the inlet port 140 nor any drainage and the outlet port 138 from communicating with the inlet port 140 nor the drain port 141. This results in maintaining a pressure differential, if any, created across each of the pistons 108a of the hydraulic actuators 108.

Let us now assume that a roller inclination is zero and one to one ratio between the input and output discs 16 and 18 is established. In FIG. 1, a direction of rotation of the input disc 16 is clockwise as indicated by an arrow 16′, while a direction of rotation of the output disc 18 is counterclockwise as indicated by an arrow 18′.

If a reduction ratio larger than the initial ratio as mentioned above is desired, the stepper motor 122 is rotated clockwise through a number of steps which is determined by the control unit 122a. Through the engagement of the pinion 123 with the rack rod 124, this rotation of the stepper motor 122 causes a translation of the rack 124 and inner sleeve 126 in a downshift direction, i.e., to the left viewing in FIG. 1. This translation of the inner sleeve 126 opens fluid communication between the inlet port 140 and the outlet port 138 and opens fluid communication between the outlet port 136 and the drainage since the spool 128 stays in the initial position. This causes hydraulic fluid to be supplied to the chambers 108d from the source of line pressure, and hydraulic fluid to be discharged from the chambers 108c, creating an upward force acting on the piston 108a of the hydraulic actuator 108 disposed on the lefthand side viewing in FIG. 1, and a downward force acting on the piston 108a of the hydraulic actuator 108 disposed on the righthand side viewing in FIG. 1. Since the roller carriers 86 are subject to the upward and downward forces and moveable along their carrier axes accordingly, the translational motions along their carrier axes and in the opposite directions occur. These translational motions induce inclinations of the roller carriers 86 about their carrier axes toward a desired ratio position between the input and output discs 16 and 18. In the case of the roller carrier 86 on the lefthand side, the roller carrier 86 rotates counterclockwise viewing FIG. 1 from the bottom along the carrier axis thereof, while in the case of the other roller carrier 86 on the righthand side, the roller carrier 86 rotates clockwise viewing FIG. 1 from the bottom along the carrier axis thereof. This rotational motion of the roller carrier 86 on the lefthand side in FIG. 1 is transmitted to the precess cam 116 by the motion transmitting rod 86d, causing the presess cam 116 to rotate accordingly. The rotation of the cam 116 causes the L-shaped lever 118 to rotate about a shaft 118a counterclockwise viewing in FIG. 1, allowing the spool 128 to move to the left as viewed in FIG. 1 owing to the action of the first spring 132. When the spool 128 establishes again the relative position to the inner sleeve 126, as illustrated in FIG. 1 and the ratio control valve 120 assumes again the stable state, the outlet ports 136 and 138 are both blocked, preventing a further supply of hydraulic fluid to the chambers 138d and a discharge of hydraulic fluid from the chambers 108c. Thus, the desired position of the friction rollers 20 is maintained.

If, subsequently, a smaller reduction ratio is desired, the rack 124 and inner sleeve 126 moves in an upshift direction, to the right, as viewed in FIG. 1, relative to the spool 128, opening fluid communication between the outlet port 136 and the inlet port 140 and fluid communication between the outlet port 138 and the drain port 141. This causes hydraulic fluid to be discharged from the chambers 108d and hydraulic fluid to be supplied to the chambers 108c from the source of line pressure, creating a downward force acting one the piston 108a of the hydraulic actuator 108 disposed on the lefthand side, viewing in FIG. 1, and an upward force acting on the piston 108a of the hydraulic actuator 108 disposed on the righthand side viewing in FIG. 1. Since the roller carriers 86 are subject to the downward and upward forces and moveable along their carrier axes accordingly, the translational motions along their carrier axes and in the opposite directions occur. These translational motions induce inclinations of the roller carriers 86 about their carrier axes toward a desired ratio position between the input and output discs 16 and 18. In the case of the roller carrier 86 on the lefthand side, the roller carrier 86 rotates clockwise viewing FIG. 1 from the bottom along the carrier axis thereof, while in the case of the other roller carrier 86 on the righthand side, the roller carrier 86 rotates counterclockwise viewing FIG. 1 from the bottom along the carrier axis thereof. This rotational motion of the roller carrier 86 on the lefthand side in FIG. 1 is transmitted to the precess cam 116 by the motion of transmitting rod 86d, causing the presess cam 116 to rotate accordingly. The rotation of the cam 116 causes the L-shaped lever 118 to rotate about the shaft 118a clockwise viewing in FIG. 1, pressing the spool 128 to move to the right as viewed in FIG. 1. When the spool 128 establishes again the relative position to the inner sleeve 126, as illustrated in FIG. 1 and the ratio control valve 120 assumes again the stable state, both of the outlet ports 136 and 138 are blocked, preventing a further supply of hydraulic fluid to the chambers 138c and a discharge of hydraulic fluid from the chambers 138c. Thus, the desired position of the friction rollers 20 is maintained.

Referring to FIG. 1, the screw rod 150a is formed with an external screw thread and extending through the end portion of the L-shaped lever 118 in threaded engagement therewith. The adjustor 150 also includes a lock nut 152. The screw rod 150a has one end, i.e., a righthand end viewing in FIG. 1, in abutting engagement with the spool 128 on the adjacent axial end thereof.

Adjustment can be effected in the following manner. If an actual reduction ratio established deviates from a desired reduction ratio in the downshift direction, the screw rod 150a is turned to move away from the spool 128 after loosening the lock nut 152. When the screw rod 150a assumes a proper position, the lock nut 152 is tightened to maintain this proper position. If an actual reduction ratio established deviates from a desired reduction ratio in the upshift direction, the screw rod 150a is turned to advance toward the spool 128 after loosening the nut 152.

Since the above-mentioned deviation caused by tolerances owing to manufacture and/or assembly is adjusted without any difficulty by means of the adjustor 150, the tolerances imposed during manufacture and assembly can be made less strict, resulting in improved production efficiency.

Although in the previously described embodiment, the adjustor 150 is operatively disposed between the L-shaped lever 118 and the spool 128, an adjustor 150 may be disposed between a L-shaped lever 118 and a precess cam 116.

From previous description, it will be readily understood that if the toroidal continuously variable transmission is installed with an engine in a motor vehicle, a fluctuation in engine speed can be avoided by effecting the adjustment with the adjustor 150 and a good start-up performance is also maintained.

What is claimed is:

1. In a toroidal continuously variable transmission:

a housing;
co-axial input and output discs having facing toric surfaces;
a friction roller disposed between and in driving contact with said toric surfaces for transmitting torque between said input and output discs;
a roller carrier rotatably supporting said friction roller;
means grounded to said housing for rotatably supporting said roller carrier about a carrier axis;
hydraulic actuator means for biasing said roller carrier along said carrier axis;
ratio control valve means for controlling said hydraulic actuator means, said ratio control valve means including a first member moveable along a valve axis, a second member cooperating with said first member and moveable along said valve axis, and means for regulating supply of hydraulic fluid to and discharge thereof from said hydraulic actuator means in response to movement of said first member relative to said second member;
means for changing said first member from an initial position to a desired position;
means for converting a rotary motion of said roller carrier about said carrier axis into a linear motion of said second member along said valve axis; and
means for adjusting relationship between said rotary motion of said roller carrier about said carrier axis and said linear motion of said second member along said valve axis.

2. A toroidal continuously variable transmission as claimed in claim 1, wherein said converting means includes a precess cam, and said adjusting means is disposed between said precess cam and said second member of said ratio control valve.

3. A toroidal continuously variable transmission as claimed in claim 2, wherein said converting means includes a precess cam and a cam follower, and said adjusting means is provided between said cam follower and said second member of said ratio control valve.

* * * * *